United States Patent
Zhao et al.

(10) Patent No.: US 9,897,493 B2
(45) Date of Patent: Feb. 20, 2018

(54) METHOD FOR TEMPERATURE DATA ACQUISITION

(71) Applicant: Air Products and Chemicals, Inc., Allentown, PA (US)

(72) Inventors: Yan Zhao, Allentown, PA (US); Jeffrey William Kloosterman, Allentown, PA (US); Jeremy Charles Lunsford, Minneapolis, MN (US); Xianming Jimmy Li, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 184 days.

(21) Appl. No.: 15/084,631

(22) Filed: Mar. 30, 2016

(65) Prior Publication Data

US 2017/0284874 A1    Oct. 5, 2017

(51) Int. Cl.
| | |
|---|---|
| *H04N 9/47* | (2006.01) |
| *H04N 7/18* | (2006.01) |
| *G01K 13/02* | (2006.01) |
| *B01J 15/00* | (2006.01) |
| *B01J 19/00* | (2006.01) |
| *B01J 19/24* | (2006.01) |
| *C01B 3/38* | (2006.01) |
| *G01J 5/00* | (2006.01) |

(52) U.S. Cl.
CPC .......... *G01K 13/02* (2013.01); *B01J 15/005* (2013.01); *B01J 19/0013* (2013.01); *B01J 19/2415* (2013.01); *C01B 3/38* (2013.01); *B01J 2219/00051* (2013.01); *C01B 2203/0233* (2013.01); *C01B 2203/0811* (2013.01); *C01B 2203/1241* (2013.01); *C01B 2203/1619* (2013.01); *G01J 2005/0077* (2013.01); *G01K 2213/00* (2013.01)

(58) Field of Classification Search
CPC ... G01K 13/02; G01K 2213/00; B01J 15/005; B01J 19/2415; B01J 19/0013; B01J 2219/00051; C01B 3/38; C01B 2203/0811; C01B 2203/1241; C01B 2203/1619; C01B 2203/0233
USPC .......................................... 348/83
See application file for complete search history.

(56) References Cited

U.S. PATENT DOCUMENTS

| | | | |
|---|---|---|---|
| 7,348,562 B2 * | 3/2008 | Irani | ...................... G01J 5/0044 250/339.02 |
| 8,219,247 B2 | 7/2012 | Esmaili et al. | |
| 8,300,880 B2 | 10/2012 | Esmaili et al. | |
| 9,127,891 B2 | 9/2015 | Au et al. | |

(Continued)

OTHER PUBLICATIONS

Hill, T., et al., On-line optimization and reliability monitoring of your synthesis gas plant: Fact or Fiction, Mar. 12, 2007.

(Continued)

*Primary Examiner* — Jared Walker
(74) *Attorney, Agent, or Firm* — Bryan C. Hoke, Jr.

(57) ABSTRACT

A method for determining temperature information for a plurality of tubes in a furnace where one or more digital images provide temperature information for imaged tubes, and temperature information for non-imaged tubes is determined from the temperature information for the imaged tubes and measured temperatures of combined effluent from the imaged and non-imaged tubes.

10 Claims, 9 Drawing Sheets

(56) References Cited

U.S. PATENT DOCUMENTS

| | | | | |
|---|---|---|---|---|
| 2010/0310113 A1* | 12/2010 | Esmaili | ................... | B01J 8/001 |
| | | | | 382/100 |
| 2011/0113993 A1* | 5/2011 | Esmaili | .................. | F23N 1/002 |
| | | | | 110/186 |
| 2015/0330866 A1* | 11/2015 | Yang | ................... | G01M 11/081 |
| | | | | 73/112.02 |

OTHER PUBLICATIONS

Saunders, Peter, et al., Determination of reformer-tube temperature by means of CCD camera, High Temperatures—High Pressure, 1999, vol. 31, pp. 83-90.

Latham, Dean A., "Mathematical Modeling of an Industrial Steam-Methane Reformer for On-Line Deployment", Fuel Processing Technology 92 (2011), pp. 1574-1586.

\* cited by examiner

METHOD FOR TEMPERATURE DATA ACQUISITION

BACKGROUND

The present disclosure is directed to temperature data acquisition on process tubes in a furnace.

A steam methane reformer is an example of a furnace containing a plurality of process tubes. One type of furnace for steam methane reforming can utilize numerous process tubes (including one configuration that has more than 400 process tubes) containing a catalyst (for example, a reforming catalyst) for transporting a process fluid (for example, steam and a hydrocarbon) and reacting the process fluid therein. The furnace, in one example, can include vertically extending process tubes positioned in parallel rows with about 30 to 60 tubes in each row. The distance between two rows of tubes is about 2 to 3 meters. The tubes can extend vertically about 12 meters and have an outer diameter of 100 to 150 millimeters. The tubes can be positioned in the row with a center-to-center spacing of 250 to 500 mm. About 10 to 20 burners can be positioned between each set of two rows of tubes. A total of eight or more rows of tubes and nine or more rows of burners can be included in the furnace.

Generally, energy efficiency for industrial processes, such as steam methane reforming, is becoming more important. For many processes, the efficiency of the process is related to the ability to monitor/maintain certain temperatures of the process tubes. More precise monitoring of the temperature of the process tubes can permit improved energy efficiency by permitting more accurate data to be used for process control.

One way to improve the efficiency of a furnace is to maintain uniform temperatures among the process tubes at a predetermined elevation in the furnace. Thus, the measuring or monitoring of the temperature of each of the process tubes at a predetermined location or elevation can be needed to obtain the desired efficiency improvement. In addition, the process tubes of a furnace can be under very high internal pressures (up to about 50 atmospheres) and at very high temperatures (up to about 950° C.). Thus, a slight change in temperature can reduce the operational life of a process tube. For example, operating at about 10° C. above the design temperature for the tube can reduce the operational life of the tube by as much as one half. The cost of repairing and/or replacing the tubes can be high due to the use of special alloys in the tubes that are needed to permit the tubes to survive the operational conditions of the furnace. In addition, the loss of production due to repairing the tubes results in lost revenue. As such, furnace operators also measure/monitor the tube temperatures to avoid exceeding the tube design temperature in addition to trying to obtain efficiency improvements.

In one method of measuring/monitoring the temperature of process tubes, an operator may use an optical pyrometer. When using the optical pyrometer, the operator aims the device at a predetermined location on a process tube and then activates the device. Upon activation, the optical pyrometer measures thermal radiation and displays or records a corresponding temperature for the predetermined location on the process tube and the operator logs the measured temperature for each tube. The operator repeats the process for each of the tubes. The use of the optical pyrometer has several drawbacks in that high temperature exposure may occur, the same predetermined location may not be used for all tubes, the temperature of a selected tube may not be measured, the same tube may be inadvertently measured twice instead of the desired adjacent tube, and the process may take too long resulting in temperature fluctuations for the tubes.

More recently, thermal imaging devices have been implemented to measure/monitor the temperature of the process tubes. An example of a thermal imaging device and method is described in U.S. Pat. No. 8,300,880 B2, incorporated herein by reference. In U.S. Pat. No. 8,300,880 B2, a single imaging device is moved from viewport to viewport to collect a plurality of images and temperature information is obtained for most or all of the process tubes. This approach has the advantage of being able to obtain temperature information for all of the process tubes but the disadvantage of requiring the operator to move the imaging device from viewport to viewport.

A thermal imaging device suitable for obtaining temperature information of process tubes is described in U.S. patent application Ser. No. 14/963,644, incorporated herein by reference. In U.S. patent application Ser. No. 14/963,644, an imaging device that can be fixed to the viewport door is disclosed. Multiple imaging devices, each mounted to a different viewport door, can be used to obtain temperature information for most or all of the process tubes in the furnace. This approach has the advantage of being able to obtain temperature information for all of the process tubes without requiring the operator to move the imaging device from viewport to viewport. This approach also has the advantage of being capable of providing repeated periodic temperature measurements in a somewhat continuous manner. This approach has the disadvantage of requiring many thermal imaging devices, which may be expensive.

Industry desires to obtain temperature information for a plurality of process tubes in a furnace without requiring an operator to move from viewport to viewport to capture the temperature information.

Industry desires to determine temperature information for a plurality of process tubes in a furnace with a reduced number of fixed thermal imaging devices, i.e. without requiring a full complement thermal imaging devices where each and every process tube is thermally imaged.

Industry desires repeated periodic temperature measurements for process control.

BRIEF SUMMARY

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A method for determining temperature information for a plurality of tubes (4) in a furnace (1), the method comprising:

capturing one or more digital images of an interior area of the furnace (1) wherein the one or more digital images comprises pixel data associated with a subset of the plurality of tubes (4) positioned inside the furnace (1);

identifying a plurality of imaged tubes (10) in the subset of the plurality of tubes (4) in the one or more digital images, the plurality of tubes (4) comprising the imaged tubes (10) and non-imaged tubes (11), the imaged tubes (10) detected in the one or more digital images, the non-imaged tubes (11) not detected in any of the one or more digital images;

processing a portion of the pixel data associated with the plurality of imaged tubes (10) to obtain a value representing a measure of central tendency for at least a subset (10*a*) of the plurality of imaged tubes (10) in the one or more digital images;

processing the value representing the measure of central tendency for at least the subset (10*a*) of the plurality of imaged tubes (10) to obtain temperature information for at least the subset (10*a*) of the plurality of imaged tubes (10);

withdrawing an effluent (e.g. reformate) from each of the plurality of tubes (4);

collecting the effluent withdrawn from each of the plurality of tubes in a plurality of secondary collection headers (6), each of the plurality of secondary collection headers (6) operatively connected to a respective group of multiple groups of the plurality of tubes (4), the effluent collected in each secondary collection header (6) forming a respective combined effluent in each secondary collection header (6);

passing the effluent collected in each respective secondary collection header (6) to a primary collection header (7);

measuring a value relatable to a temperature of the combined effluent in one or more secondary collection headers (6*a*) of the plurality of secondary collection headers (6) (for example using temperature sensor 5*a*); and processing the value representing the measure of central tendency for at least the subset (10*a*) of the plurality of imaged tubes (10) and the value relatable to the temperature of the combined effluent in the one or more secondary collection headers (6*a*) to obtain temperature information for at least a subset (11*a*) of the non-imaged tubes (11) of the plurality of tubes (4).

Aspect 2. The method of aspect 1 further comprising measuring a value relatable to a temperature of the combined effluent for each of one or more additional secondary collection headers (6*b*) of the plurality of secondary collection headers (6) (for example with using thermocouple 5*b*);

wherein the value relatable to the temperature of the combined effluent for each of the one or more additional secondary collection headers (6*b*) is processed in the step of processing to obtain temperature information for at least the subset (11*a*, 11*b*) of the non-imaged tubes (11).

Aspect 3. The method of aspect 1 or aspect 2 wherein the step of processing to obtain temperature information for at least the subset (11*a*) of the non-imaged tubes (11) of the plurality of tubes (4) comprises:

calculating a representative effluent temperature for each imaged tube (10) in a first tube row section (12*a*), each imaged tube (10) in the first tube row section (12*a*) operatively connected to a first secondary collection header (6*a*) wherein the effluent from each imaged tube (10) in the first tube row section (12*a*) is combined in the first secondary collection header (6*a*) before the combined effluent is passed to the primary collection header (7), wherein the representative effluent temperature for each imaged tube (10) in the first tube row section (12*a*) is calculated from a correlation using the value representing the measure of central tendency for each imaged tube (10) in the first tube row section (12*a*), wherein the correlation provides representative effluent temperatures from values representing the measure of central tendency; and processing the representative effluent temperature for each imaged tube (10) in the first tube row section (12*a*) and the value relatable to the temperature of the combined effluent in the one or more secondary collection headers (6*a*);

wherein the step of measuring a value relatable to the temperature of the combined effluent in the one or more secondary collection headers (6) comprises measuring a value relatable to a temperature of the combined effluent in the first secondary collection header (6*a*).

Aspect 4. The method of aspect 3 wherein the step of processing to obtain temperature information for at least the subset (11*a*) of the non-imaged tubes (11) of the plurality of tubes (4) comprises:

calculating a representative effluent temperature for each non-imaged tube (11) in a second tube row section (12*b*) operatively connected to the first secondary collection header (6*a*), the representative effluent temperature for each non-imaged tube (11) in the second tube row section (12*b*) calculated from the representative effluent temperature for each imaged tube (10) in the first tube row section (12*a*).

Aspect 5. The method of aspect 3 wherein the step of processing to obtain temperature information for at least the subset (11*a*) of the non-imaged tubes (11) of the plurality of tubes (4) comprises:

calculating a representative effluent temperature for each non-imaged tube (11) in a second tube row section (12*b*) operatively connected to a second secondary collection header (6*c*), the representative effluent temperature for each non-imaged tube (11) in the second tube row section (12*b*) calculated from the representative effluent temperature for each imaged tube (10) in the first tube row section (12*a*);

wherein the step of measuring a value relatable to the temperature of the combined effluent in the one or more secondary collection headers (6) further comprises measuring a value relatable to a temperature of the combined effluent in the second secondary collection header (6*a*), wherein the effluent from each non-imaged tube (11) in the second tube row section (12*b*) is combined in the second secondary collection header (6*c*) before the combined effluent is passed to the primary collection header (7).

Aspect 6. The method of any one of aspects 1 to 4 wherein the step of processing to obtain temperature information for at least the subset (11*a*) of the non-imaged tubes (11) of the plurality of tubes (4) comprises:

calculating a representative effluent temperature for each imaged tube (10) in a first tube row section (12*a*), each imaged tube (10) in the first tube row section (12*a*) operatively connected to a first secondary collection header (6*a*) wherein the effluent from each imaged tube (10) in the first tube row section (12*a*) is combined in the first secondary collection header (6*a*) before the combined effluent is passed to the primary collection header (7), wherein the representative effluent temperature for each imaged tube (10) in the first tube row section (12*a*) is calculated from a correlation using the value representing the measure of central tendency for each imaged tube (10) in the first tube row section (12*a*), wherein the correlation provides representative effluent temperatures from values representing the measure of central tendency; and calculating a representative temperature for a combined effluent from the imaged tubes (10) in the first tube row section (12a) using the representative effluent temperature for each imaged tube (10) in the first tube row section (12a);

wherein the step of measuring a value relatable to the temperature of the combined effluent in the one or more secondary collection headers (6) comprises measuring a value relatable to a temperature of the combined effluent in the first secondary collection header (6a); and wherein the step of processing to obtain temperature information for at least the subset (11a) of the non-imaged tubes (11) of the plurality of tubes (4) further comprises:

calculating a representative temperature for a combined effluent from the non-imaged tubes (11) in a second tube row section (12b) operatively connected to the first secondary collection header (6a) wherein the effluent from each non-imaged tube (11) in the second tube row section (12b) is combined in the first secondary collection header (6a) before the combined effluent is passed to the primary collection header (7), wherein the representative temperature for the combined effluent from the non-imaged tubes (11) in the second tube row section (12b) is calculated from the value relatable to the temperature of the combined effluent in the first secondary collection header (6a) and the representative temperature for the combined effluent from the imaged tubes (10) in the first tube row section (12a);

determining a first temperature relationship, the first temperature relationship between the representative effluent temperature for each imaged tube (10) in the first tube row section (12a) and the representative temperature for the combined effluent from the imaged tubes (10) in the first tube row section (12a);

formulating a second temperature relationship, the second temperature relationship between a representative effluent temperature for each non-imaged tube (11) in the second tube row section (12b) and the representative temperature for the combined effluent from the non-imaged tubes (11) in the second tube row section (12b), where the second temperature relationship is formulated using at least the first temperature relationship;

calculating the representative effluent temperature for each non-imaged tube (11) in the second tube row section (12b) from the representative temperature for the combined effluent from the non-imaged tubes (11) in the second tube row section (12b) and the second temperature relationship; and calculating the temperature information for the non-imaged tubes (11) from the representative effluent temperature for each non-imaged tube (11) in the second tube row section (12b) and a correlation that provides the temperature information for the non-imaged tubes (11) from the representative effluent temperatures.

Aspect 7. The method of aspect 1, aspect 2, aspect 3, or aspect 5 wherein the step of processing to obtain temperature information for at least the subset (11a) of the non-imaged tubes (11) of the plurality of tubes (4) comprises:

(a) calculating a representative effluent temperature for each imaged tube (10) in a first tube row section (12a), each imaged tube (10) in the first tube row section (12a) operatively connected to a first secondary collection header (6a) wherein the effluent from each imaged tube (10) in the first tube row section (12a) is combined in the first secondary collection header (6a) before the combined effluent is passed to the primary collection header (7), wherein the representative effluent temperature for each imaged tube (10) in the first tube row section (12a) is calculated from a correlation using the value representing the measure of central tendency for each imaged tube (10) in the first tube row section (12a), wherein the correlation provides representative effluent temperatures from values representing the measure of central tendency;

wherein the step of measuring a value relatable to the temperature of the combined effluent in the one or more secondary collection headers 6 comprises measuring a value relatable to a temperature of the combined effluent in the first secondary collection header (6a); and measuring a value relatable to a temperature of a combined effluent in a second secondary collection header (6c), wherein a second tube row section (12b) of non-imaged tubes (11) is operatively connected to the second secondary collection header (6c), wherein the effluent from each non-imaged tube (11) in the second tube row section (12b) is combined in the second secondary collection header (6c) before the combined effluent is passed to the primary collection header (7); and wherein the step of processing to obtain temperature information for at least the subset (11a) of the non-imaged tubes (11) of the plurality of tubes (4) further comprises:

determining a first temperature relationship, the first temperature relationship between the representative effluent temperature for each imaged tube (10) in the first tube row section (12a) and the value relatable to the temperature of the combined effluent in the first secondary collection header (6a);

formulating a second temperature relationship, the second temperature relationship between a representative effluent temperature for each non-imaged tube (11) in the second tube row section (12b) and the value relatable to the temperature of the combined effluent in the second secondary collection header (6c), where the second temperature relationship is formulated using at least the first temperature relationship;

calculating the representative effluent temperature for each non-imaged tube (11) in the second tube row section (12b) from the value relatable to the temperature of the combined effluent in the second secondary collection header (6c) and the second temperature relationship; and calculating the temperature information for the non-imaged tubes (11) from the representative effluent temperature for each non-imaged tube (11) in the second tube row section (12b) and a correlation that provides the temperature information for the non-imaged tubes (11) from the representative effluent temperatures.

Aspect 8. The method of any one of the preceding aspects wherein the step of processing the value representing the measure of central tendency for at least the subset (10*a*) of the plurality of imaged tubes (10) comprises determining temperature values for at least the subset (10*a*) of the plurality of imaged tubes (10) from the corresponding value representing the measure of central tendency for at least the subset (10*a*) of the plurality of imaged tubes (10).

Aspect 9. The method of any one of the preceding aspects wherein the step of processing the value representing the measure of central tendency for at least the subset (10*a*) of the plurality of imaged tubes (10) and the value relatable to the temperature of the combined effluent in the one or more secondary collection headers (6*a*) to obtain temperature information for at least the subset (11*a*) of the non-imaged tubes (11) of the plurality of tubes (4) comprises determining a temperature value for at least the subset (11*a*) of the non-imaged tubes (11) from the value representing the measure of central tendency for at least the subset (10*a*) of the plurality of imaged tubes (10) and the value relatable to the temperature of the combined effluent in the one or more secondary collection headers (6*a*).

Aspect 10. The method of any one of the preceding aspects further comprising:

measuring a value relatable to a temperature of a tube wall for one or more of the plurality of tubes (4) positioned within the furnace (1) (for example with an optical pyrometer (15));

wherein the value relatable to the temperature of the tube wall for the one or more of the plurality of tubes is also processed to obtain the temperature information for at least the subset (11*a*) of the non-imaged tubes (11) of the plurality of tubes (4); and wherein at least the subset (11*a*) of non-imaged tubes (11) comprises non-imaged tubes where the value relatable to the temperature of the tube wall was not measured.

One advantage of the present method is improved monitoring of process tube temperatures to obtain improved furnace efficiency and to extend the operational life of the process tubes.

Another advantage of the present method is a standardized measuring/monitoring process.

Still another advantage of the present method is to reduce the number of thermal imaging devices need to obtain temperature information for the process tubes in a furnace.

Still yet another advantage of the present method is improved cost-savings and time-savings for the measuring/monitoring process tubes.

Further aspects of the method are disclosed herein. The features as discussed above, as well as other features and advantages of the present method will be appreciated and understood by those skilled in the art from the following detailed description and drawings.

BRIEF DESCRIPTION OF SEVERAL VIEWS OF THE DRAWINGS

Wherever possible, the same reference numbers will be used throughout the drawings to represent the same parts.

DETAILED DESCRIPTION OF THE PREFERRED EMBODIMENTS

Figure 1:
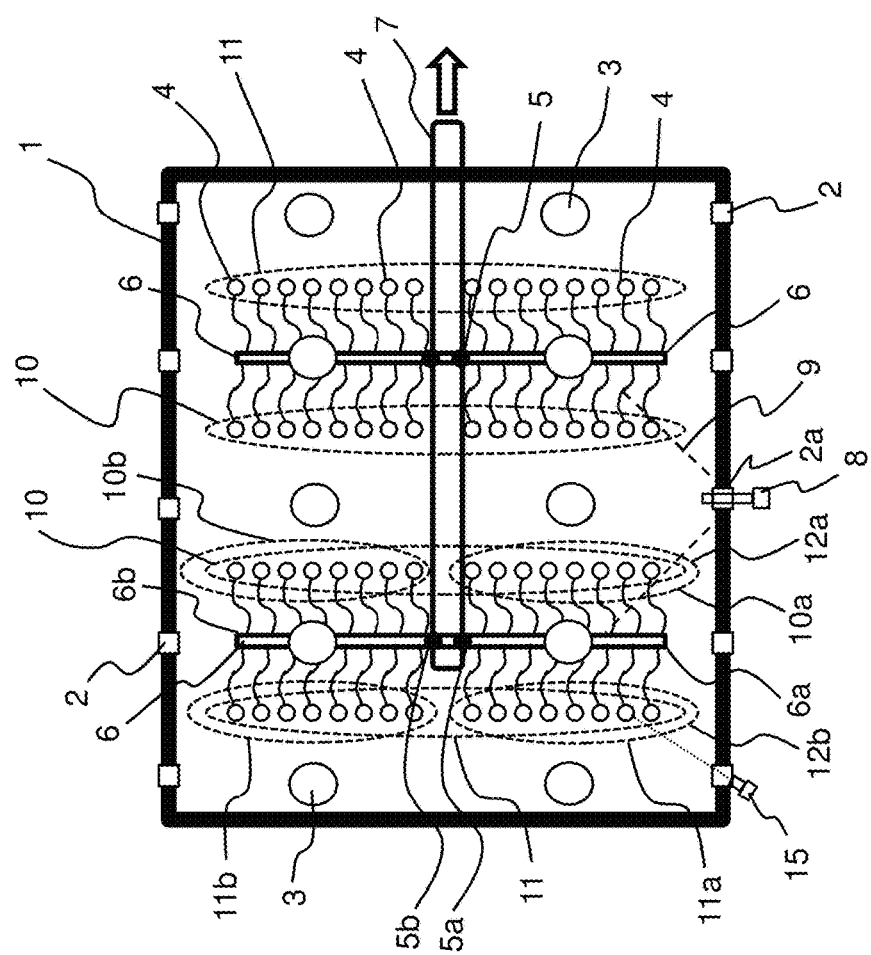
FIG. 1 shows a cross-sectional view of a furnace as viewed from the top.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

As used herein, "plurality" means "two or more than two."

As used herein, "first," "second," "third," etc. are used to distinguish from among a plurality of steps and/or features, and is not indicative of the total number, or relative position in time and/or space unless expressly stated as such.

In order to aid in describing the invention, directional terms may be used in the specification and claims to describe portions of the present invention (e.g., upper, top, lower, bottom, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

The present disclosure relates to a method for determining temperature information for a plurality of tubes in a furnace. The plurality of tubes for which temperature information is determined may consist of less than the total number of tubes in the furnace. The method is described more fully hereinafter with reference to the accompanying drawings.

FIG. 1 shows a cross-sectional representation of a furnace 1 with process tubes 4 positioned within an interior area of furnace 1 as viewed from the top. Furnace 1 may be a steam methane reformer, methanol reformer, ethylene cracker, platform reheat furnace, radiant heat chamber, or other similar type of furnace, reformer or chamber. Tubes 4 can be positioned in a plurality of rows separated by heating elements or burners 3. Tubes 4 can extend either vertically, as shown, or horizontally in furnace 1. The tubes 4 may be catalyst-containing reformer tubes. Burners 3 may be arranged in rows to introduce a fuel and oxidant (e.g. preheated air) for combustion to raise the temperature of the interior area of the furnace 1 to a desired temperature to accomplish the process or activity to be performed inside the furnace 1. The rows of tubes 4 and rows of burners 3 can be substantially parallel. Along the perimeter of furnace 1 are view ports 2 that permit tubes 4, burners 3 and any other structure or feature inside furnace 1 to be viewed and/or analyzed from a point exterior to the furnace 1. Pairs of view ports 2 may be positioned on the perimeter of the furnace 1 at opposite ends of a row of burners 3.

One or more thermal imaging devices (e.g. cameras) 8 may be disposed to take digital images of the tubes. Each of the one or more thermal imaging devices 8 may be mounted through a respective viewport 2a of the furnace 1, as shown in FIG. 1.

Figure 2:
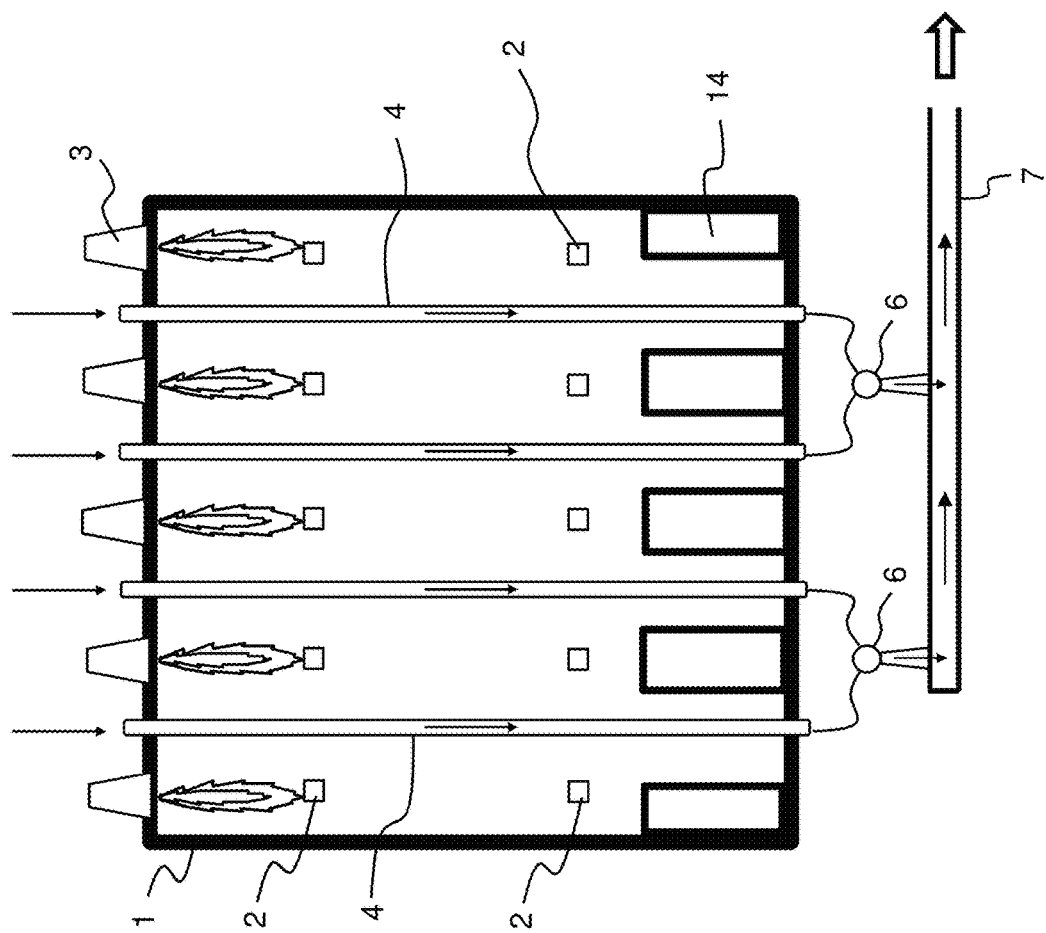
FIG. 2 shows a cross-section view of a furnace as viewed from the side.

FIG. 2 shows a cross-sectional representation of a furnace 1 with process tubes 4 positioned within an interior area of furnace 1 as viewed from the side. The tubes 4 are shown to extend from the top of the furnace to the bottom of the furnace where "pigtails" are connected at the outlet end of the tubes 4. The pigtails connect the process tubes 4 to secondary collection headers 6. Groups of process tubes 4 are formed, the process tubes 4 of each group connected to a respective one of the secondary collection headers 6. It follows that all process tubes 4 of a first group of process tubes 4 are operatively connected to a first secondary collection header 6 and all process tubes 4 of a second group of process tubes 4 are operatively connected to another collection header 6, i.e. to a second secondary collection header 6. The plurality of process tubes 4 may comprise one or more further, i.e. a third, fourth, etc. group(s) of process tubes 4 each process tube 4 of the same further group operatively connected to a respective further, i.e. third, fourth, etc. secondary collection header 6. Two tube row sections may be connected to a common secondary collection header 6, as shown. The secondary collection headers 6 may be connected to a primary collection header 7.

The furnace 1 may have view ports 2 at one or more levels or elevations. The view ports 2 may be centered between each row of tubes or offset with respect to the rows of tubes. Having view ports 2 at more than one level permits greater viewing capability of the tubes 4. Improved viewing capability of the tubes may be further facilitated using more than one viewport between at least some rows of tubes.

The method comprises capturing one or more digital images of an interior area of a furnace 1 wherein the one or more digital images comprises pixel data associated with a subset of the plurality of tubes 4 positioned inside the furnace 1.

A subset as used herein, is a set, each of whose elements is an element of a larger set or group. Then a subset of the plurality of tubes is a set of tubes belonging to the total set of the plurality of tubes but containing less than the total number in the set of the plurality of tubes.

The digital images may be obtained by directing a thermal imaging device 8 (e.g. a digital camera) through a view port 2a (i.e. the view port having the thermal imaging device) or a hole in the furnace, and then capturing the corresponding image information, i.e., "taking a picture" of the corresponding portion of the interior area. The digital images may be taken by a digital camera or any other device capable of capturing digital image information. The images may be captured using any suitable thermal imaging device, for example, as available from AMETEC Land, Lenox Instrument Company, FLIR Systems, Inc., Enertechnix, Inc. or as described in U.S. Pat. No. 8,300,880 B2 or U.S. patent application Ser. No. 14/963,644.

The thermal imaging device 8 may be a hand-held portable device or preferably a fixed mounted device. The thermal imaging device 8 may be mounted in the viewport as described in U.S. patent application Ser. No. 14/963,644.

The thermal imaging device may capture an image (or multiple images) through the view port 2 of a portion of the interior area of the furnace 1. The image may include a row of tubes 4 located along the left side of the image and another row of tubes 4 located along the right side of the image. In addition, the image may include an opposing view port. The opposing view port may be used to capture an image from the opposite wall of furnace 1. The image may include other structures and/or features of the interior area of the furnace 1 that are within the field of view of the camera.

The portion of the interior area captured in an image may overlap or include similar portions of the interior area captured in one or more other images taken from other view ports. Stated differently, the portion of the interior area shown in one image may include structures or features that are also shown in one or more other images. For example, images taken from adjacent view ports 2 may show some of the same tubes 4 from different angles. Similarly, images taken from opposite viewports 2 may show some of the same tubes at different angles. Furthermore, the images are not required to correspond or map to specific or exclusive regions of the interior area and may show substantially similar regions or portions of the interior area.

The imager or sensor that is incorporated in the thermal imaging device can include pixels that record the intensity of light received at the pixel. The number of pixels in the camera corresponds to the resolution of the camera. The camera can have any suitable resolution, for example, a resolution between about 1 megapixel (approximately 1 million pixels) to about 10 megapixels (approximately 10 million pixels) or more. Each pixel in the imager or sensor can have one or more components or channels that record the intensity of light. Each pixel of the imager or sensor may have three components or channels, which may correspond to red (R), green (G) and blue (B) channels. The channels or components of the pixel can be configured to be more receptive to light at certain predetermined frequencies and less receptive to light at other predetermined frequencies when recording the intensity of light. In other words, light at certain predetermined frequencies can contribute more to the overall intensity measurement than light at other predetermined frequencies. When an image is captured, the recorded intensities for each channel or component of each pixel are stored as image data or pixel data. The pixels may be configured to measure the intensity of light in the visible spectrum. Alternatively, each of the three channels (RGB) may be configured to measure the intensity of light in the near infrared spectral range.

After the images of the furnace 1 are obtained, the corresponding image data for each of the images may be loaded into a computer or other processing device for additional processing and analysis.

A single thermal imaging device may be used to capture the one or more digital images of the interior area of the furnace 1. Utilizing the single thermal imaging device to capture all of the images may increase the consistency of subsequent processing and analysis of the image data because the images are captured under uniform device conditions such as uniform signal to noise levels and uniform sensitivities to different wavelengths.

Alternatively, a plurality of thermal imaging devices 8 may be used and directed through different view ports 2 of the furnace 1 to capture the one or more digital images of the interior area of the furnace. The thermal imaging devices may each make repeated periodic measurements of the tubes 4 to obtain digital images over a period of time. Subsequent processing and analysis of the image data should account for differences in the thermal imaging device conditions such as differences in the sensitivities to different wavelengths and the differences in signal to noise ratios as a result of differences in conditions between devices and/or models of devices. The accounting for differences in thermal imaging device conditions may be needed to make image data acquired from one thermal imaging device correspond with image data acquired from another thermal imaging device.

When capturing an image of the interior area of the furnace 1, the camera can include one or more filters to prevent or reduce certain wavelengths of light from reaching the imager or sensor. The image or sensor can include charge-coupled devices (CCDs) and/or complementary metal-oxide semiconductor (CMOS) devices. The filter can be designed to permit a desired percentage of the light at a predetermined wavelength to pass through the filter and reach the sensor. The filter may be designed to permit less light, i.e., less than 50% of the light, to pass through the filter at wavelengths that are less than the predetermined wavelength, and to permit more light, i.e., greater than 50% of the light, to pass through the filter at wavelengths that are greater than the predetermined wavelength. The predetermined wavelength can be about 715 nm. The predetermined wavelength can be between about 300 nm or less, and/or 1000 nm or more.

The images may be corrected using distortion correction as described in U.S. Pat. No. 8,300,880.

The images may be processed using a computer to correct for any rotation or deviation ("rotation correction") from a specific position, for example, a "centered position" as described in U.S. Pat. No. 8,300,880. Any suitable method for rotation correction may be used in connection with the present method.

The "corrected" images, may be processed using a computer to detect or determine the edges of the tubes 4 and/or any other desirable features, for example, opposing view port 2, in the image. The detected edges of the tubes 4 and the detected features from the image may be adjusted or modified in view of a geometric model of the furnace 1 as described in U.S. Pat. No. 8,300,880.

The method comprises identifying a plurality of imaged tubes 10 in the subset of the plurality of tubes 4 in the one or more digital images. The one or more digital images may be obtained through one or more view ports 2. In FIG. 1, a thermal imaging device 8 is located at view port 2a. FIG. 1 shows the field of view 9 of the thermal imaging device 8 when taking images from view port 2a. As can be seen in FIG. 1, the field of view 9 of the thermal imaging device 8 includes imaged tubes 10. The plurality of tubes 4 in the furnace 1 comprise imaged tubes 10 and non-imaged tubes 11. The imaged tubes 10 are the tubes that are detected in at least one of the one or more digital images and the non-imaged tubes 11 are not detected in any of the one or more digital images. Obviously there are more imaged tubes when more digital images are obtained from more distinct view ports. In the present method, at least some of the tubes 4 are non-imaged tubes.

The method comprises processing a portion of the pixel data associated with the plurality of imaged tubes 10 to obtain a value representing a measure of central tendency for at least a subset 10a of the plurality of imaged tubes 10 in the one or more digital images of the plurality of digital images.

The method comprises processing the value representing the measure of central tendency for at least the subset 10a of the plurality of imaged tubes 10 to obtain temperature information for at least the subset 10a of the imaged tubes 10. This step may comprise determining temperature values for at least the subset 10a of the plurality of imaged tubes 10 from the corresponding value representing the measure of central tendency for at least the subset 10a of the plurality of imaged tubes 10.

The temperature information of the imaged tubes 10 is determined based on the pixel data from the one or more digital images. To determine a temperature value for an imaged tube 10 in an image, the pixel data in the segment of the corresponding imaged tube 10 is processed to determine a value representing a measure of central tendency, which may then be correlated to a temperature. The temperature or temperature value is a representative value for a tube. The tube temperature varies along the tube length. It may be desirable to determine the temperature information for the tubes at a location where the highest tube temperature can be expected.

The processing of the pixel data, for example, intensity values, begins with obtaining a value representing a measure of central tendency, for each channel or component, from the pixel data of the pixels in the segment. The value representing a measure of central tendency may be a median of the pixel data. Alternatively, the value representing a measure of central tendency may be a mean, robust mean, mode or other statistical measure derived from the pixel data. The value representing a measure of central tendency for each channel or component is then correlated to a temperature value.

The temperature value for a segment determined from the value representing a measure of central tendency can also be assigned an uncertainty value. The uncertainty value can quantify the confidence in the determined temperature value. Numerous factors such as the distance of the tube from the camera (path length, "d"), the camera angle (formed by a center line of the camera and the position of imaged tube 10, "α"), the number of pixels in the segment representing the tube, can affect the confidence of a temperature value determination. If the pixel data includes multiple channels or components, the temperature value for each of the channels or components can be averaged using a statistical averaging technique, for example, average, weighted average, etc., to obtain a single temperature value for the segment, which corresponds to an imaged tube 10.

To obtain a correlation between temperature values and the pixel data, a relationship between known temperatures and pixel data may be formed and stored in a database or other memory device for accessibility in the future. One technique to obtain the relationship between pixel data and temperature involves capturing an image of the interior area and then soon thereafter following the image capture with the acquisition of temperature measurements of the tubes in the portion of the interior area corresponding to the image. The temperature measurements of the tubes may be performed with an optical pyrometer or other suitable device. The values representing a measure of central tendency from the image, which correspond to tubes 4, are then compared to the temperature measurements to establish a correlation or relationship between temperature and pixel value. Other techniques to obtain temperature information for the tubes 4 can also be used to establish the relationship or correlation to pixel values. Once a relationship or correlation between temperatures and pixel values is established, the correlation can be used for subsequent processing of images.

Alternatively, instead of determining a temperature value for each imaged tube 10 in each image, the segment pixel data or the values representing a measure of central tendency can be continued to be processed in a manner similar to that discussed above (including the application of uncertainty values) to generate a representation of the furnace 1 in pixel data or statistical values. The pixel data or values representing a measure of central tendency in the representation of the furnace can then be converted to temperatures using the relationship or correlation discussed above to obtain a representation of the furnace based on temperature values.

A multivariate regression method (such as Partial Least Squares) can be used to establish a correlation between the temperature of the specific tubes for which independent temperature measurements are available and the pixel data from an image. The correlation can incorporate variables including, but not limited to, channel pixel values, for example, R, G, B values, d, $\alpha$, other suitable quantifiable measurements, and/or combinations thereof. For example, the correlated value of the tube temperature can be represented as $\hat{T}_j$ (for tube j) and the independent variables as $x_{ij}$, where i denotes the $i^{th}$ variable, from a partial list of variables where $$x \in \left\{ R, G, B, 1/d, \frac{1}{d^2}, \alpha, \ldots \right\}.$$

Other variables associated with the tube temperature may include the R, G, B of the previous and next tubes. The tube 4 temperature at a predetermined location can be represented as a linear combination of these variables with unknown coefficients $A_i$ such that $\hat{T}_j = \Sigma_i A_i x_{ij}$. Given a set of independent temperature measurements, $T_j$, where j=1, 2, . . . , n, which can come from a pyrometer, the unknown coefficients can be determined by minimizing the error between the actual data and the prediction in the least squares sense:

$$\min_{j=1,n}\{(T_j - \hat{T}_j)^2\} = \min_{j=1,n}\left\{\left(T_j - \sum_i A_i x_{ij}\right)^2\right\}.$$

These evaluations can be systematically performed with the aid of standard statistical and mathematical software tools (for example, Matlab®). The final result of the evaluations can generate a correlation between data from image and temperatures of tubes 4 in the least squares sense $\hat{T} = \Sigma_i A_i x_i$ allowing temperature estimates for all tubes in the images (not just those for which independent temperature measurements are available).

The method comprises withdrawing an effluent from each of the plurality of tubes 4. A reactant gas mixture, for example a reformer feed gas mixture containing steam and one or more hydrocarbons, may be introduced into the tubes 4. The reactant gas mixture may be reacted inside the tubes 4 in the presence of a catalyst contained within the tubes 4. An effluent, for example a reformate comprising $H_2$, CO, $CO_2$, and $H_2O$, may be withdrawn from the tubes 4 and passed to respective secondary collection headers 6.

The method comprises collecting the effluent withdrawn from each of the plurality of tubes in a plurality of secondary collection headers 6. Each of the plurality of secondary collection headers 6 are operatively connected to a respective group of multiple groups of the plurality of tubes 4. The effluent collected in each secondary collection header 6 from each group forms a respective combined effluent in each secondary collection header 6.

For example, as shown in FIG. 1, effluent from subset 10a of imaged tubes 10 and effluent from subset 11a of non-imaged tubes 11 is passed to secondary collection header 6a to form a combined effluent in secondary collection header 6a. A first secondary collection header 6a is operatively connected to a first group of the plurality of tubes 4 consisting of subset 10a of imaged tubes 10 and subset 11a of non-imaged tubes 11. Effluent from subset 10b of imaged tubes 10 and effluent from subset 11b of non-imaged tubes 11 is passed to secondary collection header 6b to form a combined effluent in secondary collection header 6b. A second secondary collection header 6b is operatively connected to a second group of the plurality of tubes 4 consisting of subset 10b of imaged tubes 10 and subset 11b of non-imaged tubes 11.

The method comprises passing the effluent collected in each respective secondary collection header 6 to a primary collection header 7. The effluent may be transported through primary collection header 7 to downstream processing unit operations. In the case of hydrogen production, the effluent (reformate) may be passed to various heat exchangers, shift reactor(s), and component separators such as a pressure swing adsorption unit.

The method comprises measuring a value relatable to a temperature of the combined effluent in one or more secondary collection headers 6a of the plurality of secondary collection headers 6. The value relatable to the temperature of the combined effluent in each of the secondary collection headers may be measured using temperature sensors 5. A thermocouple or any other suitable temperature sensor for measuring temperature may be used to measure the value relatable to the temperature of the combined effluent. For example, as shown in FIG. 1, temperature sensor 5a is disposed to measure the value relatable to temperature for the combined effluent from secondary header 6a. The temperature sensors may make repeated periodic measurements of the combined effluent from the secondary headers 6 to obtain values relatable to temperature over a period of time.

The method comprises processing the value representing the measure of central tendency for at least the subset 10a of the plurality of imaged tubes 10 and the value relatable to the temperature of the combined effluent in the one or more secondary collection headers 6a to obtain temperature information for at least a subset 11a of the non-imaged tubes 11 of the plurality of tubes 4. This step may comprise determining temperature values for at least the subset 11a of the plurality of non-imaged tubes 11 from the corresponding value representing the measure of central tendency for at least the subset 10a of the plurality of imaged tubes 10 and the value relatable to the temperature of the combined effluent in the one or more secondary collection headers 6a.

Useful temperature information for at least a subset of non-imaged tubes can be obtained even though there is no direct measurement made of the non-imaged tubes using the thermal imaging device. The advantage is readily apparent in that fewer thermal imaging devices are needed to get a nearly complete picture of the tube temperatures in the furnace.

Temperature information for additional non-imaged tubes may also be obtained. The method may be repeated for other sections of the furnace until temperature information for all of the tubes in the furnace is obtained. However, there is benefit even if temperature information is not obtained for all of the tubes in the furnace. For example, it may be known that some region of the furnace is particularly susceptible to overheating. The method may then only be applied in this region of the furnace susceptible to overheating.

The method may then further comprise measuring a value relatable to a temperature of the combined effluent for each of one or more additional secondary collection headers 6b of the plurality of secondary collection headers 6. As shown in FIG. 1, a temperature sensor 5b may be disposed to measure the value relatable to the temperature of the combined effluent from secondary collection header 6b.

In the step of processing to obtain temperature information for at least the subset of the non-imaged tubes 11, the value relatable to the temperature of the combined effluent for each of the one or more additional secondary collection headers 6b may be used. For example, the subset of the plurality of imaged tubes 10a is used in combination with the value relatable to the temperature of the combined effluent form secondary header 6a to obtain the temperature information for the non-imaged tubes 11a, and the subset of the plurality of imaged tubes 10b is used in combination with the value relatable to the temperature of the combined effluent form secondary header 6b to obtain the temperature information for the non-imaged tubes 11b.

The step of processing to obtain temperature information for at least the subset 11a of the non-imaged tubes 11 of the plurality of tubes 4 may comprise calculating a representative effluent temperature for each imaged tube 10 in a first tube row section 12a. Each imaged tube 10 in the first tube row section 12a is operatively connected to the secondary collection header 6a and the effluent from each imaged tube 10 in the first tube row section 12a is combined in secondary collection header 6a before the combined effluent is passed to the primary collection header 7. The representative effluent temperature for each imaged tube 10 in the first tube row section 12a may be calculated from a correlation using the value representing the measure of central tendency for each imaged tube 10 in the first tube row section 12a. The correlation provides representative effluent temperatures from values representing the measure of central tendency.

As used herein a correlation is any established relationship based on theory and/or data. The correlation may be represented in equation form and/or lookup tables or similar means.

The correlation may be developed from computer simulations, models, and/or measured data from the furnace accounting for different flow rates. The correlation may use models that describe the process of heat transfer from the hot combustion products gases to the tubes 4. The models may account for different heat transfer modes (radiation, conduction, and convection) and chemical reactions in the tubes. The correlation may be able to predict the temperature difference between the tube wall and the process effluent for each individual tube. The correlation may be adjusted and verified using experimentally measured tube wall temperatures and measured process gas temperatures.

Reformer models useful for developing the correlation are known in the art, for example, Grotendorst et al., "Computer-aided Modeling and Simulation of the Thermodynamics of Steam Reforming," *Mathematics and Computers in Simulation,* pp. 1-21, 1738 (1999), and D. A. Latham et al., "Mathematical modeling of an industrial steam-methane reformer for on-line deployment," Fuel Process. Technol. (2011), doi:10.1016/j.fuproc.2011.04.001.

Figure 3:
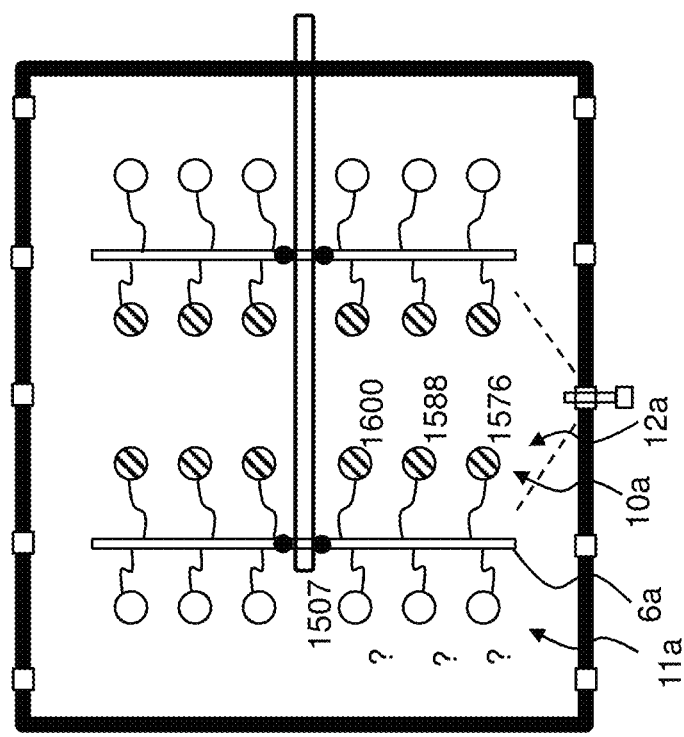
FIG. 3 shows a cross-section view of a furnace with hypothetical tube temperatures used to describe an exemplary mathematical approach for the method.
Figure 4:
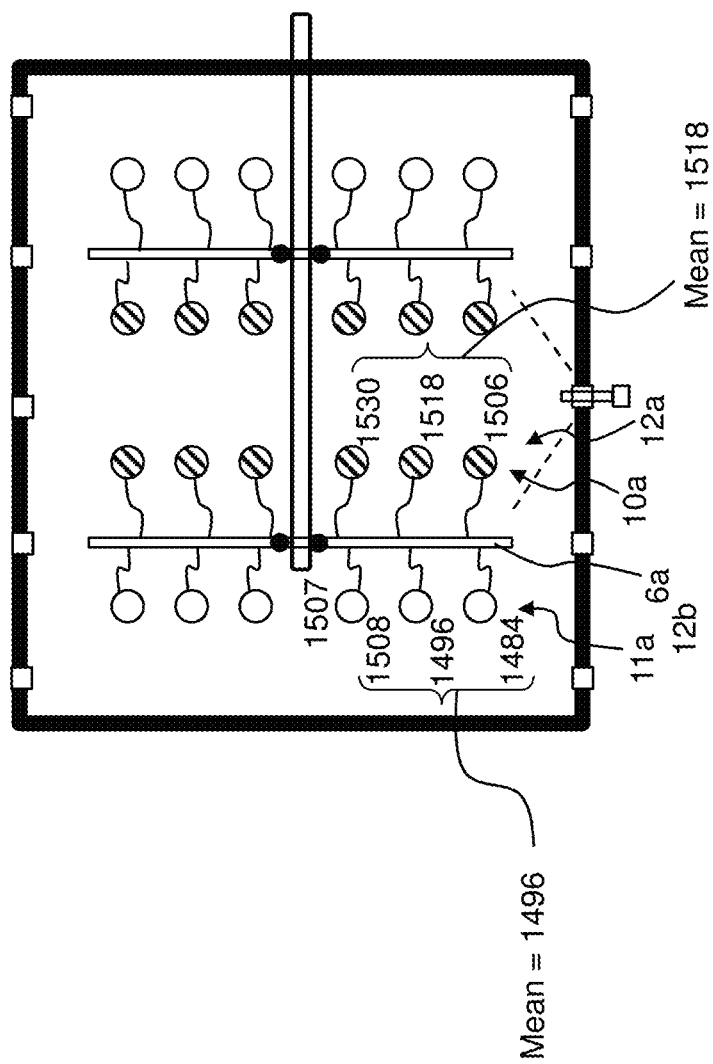
FIG. 4 shows a cross-section view of a furnace with hypothetical representative effluent temperatures used to describe the exemplary mathematical approach for the method.

This mathematical step is described with reference to FIG. 3 and FIG. 4. FIG. 3 illustrates a simplified furnace with hypothetical tube temperatures. A subset of imaged tubes 10a are assigned temperatures of 1600, 1588, and 1576. The temperature units don't matter as this is just an illustration of how the calculations can be made. The temperatures can be obtained from one or more digital images comprising pixel data associated with the subset of imaged tubes 10a. The temperatures of the non-imaged tubes 11a are the temperatures to be predicted from the temperatures of the imaged tubes 10a and the combined effluent temperature.

For this illustrative calculation, a simple correlation between the effluent temperature and the tube temperature will be assumed where the effluent temperature is 70 less than the tube temperature. Then the representative effluent temperature for each imaged tube in the tube row section is 1530, 1518, and 1506. These values for the effluent temperatures are shown in FIG. 4.

The step of processing to obtain temperature information for at least the subset 11a of the non-imaged tubes 11 of the plurality of tubes 4 may comprise calculating a representative temperature for a combined effluent from the imaged tubes 10 in the first tube row section 12a using the representative effluent temperature for each imaged tube 10 in the first tube row section 12a. The representative combined effluent temperature may be any type of average for example a mean or weighted mean value. The representative combined temperature may be determined using mass and energy balances if desired or simply using the mean value for the tubes.

For the illustrative calculation a simple mean value will be used. The mean of 1530, 1518, and 1506 is 1518.

The step of measuring a value relatable to the temperature of the combined effluent in the one or more secondary collection headers 6 may include measuring a value relatable to a temperature of the combined effluent in the first secondary collection header 6a.

For the illustrative calculation, the value relatable to the temperature of the combined effluent in the secondary collection header is assigned a value of 1507. This temperature corresponds, for example, to a temperature for the combined effluent measured by a temperature sensor in the secondary collection header.

The step of processing to obtain temperature information for at least the subset 11a of the non-imaged tubes 11 of the plurality of tubes 4 may comprise calculating a representative temperature for a combined effluent from the non-imaged tubes 11 in a second tube row section 12b operatively connected to the first secondary collection header 6a. The effluent from each non-imaged tube 11 in the second tube row section 12b is combined in the first secondary collection header 6a before the combined effluent is passed to the primary collection header 7. The representative temperature for the combined effluent from the non-imaged tubes 11 in the second tube row section 12b is calculated from the value relatable to the temperature of the combined effluent in the first secondary collection header 6a and the representative temperature for the combined effluent from the imaged tubes 10 in the first tube row section 12a.

Both the effluent from the first tube row section 12a and the effluent from the second tube row section 12b contribute to the value relatable to the temperature of the combined effluent in the secondary collection header. The contribution from the first tube row section 12a is subtracted out from the value relatable to the temperature of the combined effluent to determine the contribution from the second tube row section 12b. A simple mean approach will be used for illustration but more complex relationships may alternatively be used. The mean temperature for the combined effluent from the first tube row section and the second tube row section is 1507. The representative temperature for a combined effluent from the imaged tubes 10 in the first tube row section 12a is 1518. Then the representative temperature for a combined effluent from the non-imaged tubes 11 in the second tube row section 12b is 1496 (i.e. the mean of 1518 for the imaged tubes and 1496 for the non-imaged tubes is 1507 for the combined effluent from both the imaged tubes and the non-imaged tubes).

The step of processing to obtain temperature information for at least the subset 11a of the non-imaged tubes 11 of the plurality of tubes 4 may comprise determining a first temperature relationship between the representative effluent temperature for each imaged tube 10 in the first tube row section 12a and the representative temperature for the combined effluent from the imaged tubes 10 in the first tube row section 12a based on the tube position. For illustration purposes, the first temperature relationship will be the relative difference between representative effluent temperature for a tube and the representative temperature for the combined effluent in the tube row section. Then for example, the effluent temperature difference for the tube in the first tube row section 12a closest to the primary header 7 is +12 (i.e. 1530−1518). The effluent temperature difference for the tube in the middle is 0 (i.e. 1518−1518). The effluent temperature difference for the tube nearest the furnace wall is −12 (i.e. 1506−1518). The effluent temperature difference profile from the primary header 7 to the furnace wall is (+12, 0, −12).

The step of processing to obtain temperature information for at least the subset 11a of the non-imaged tubes 11 of the plurality of tubes 4 may comprise formulating a second temperature relationship between a representative effluent temperature for each non-imaged tube 11 in the second tube row section 12b and the representative temperature for the combined effluent from the non-imaged tubes 11 in the second tube row section 12b. The second temperature relationship may be formulated using at least the first temperature relationship based on the relative tube position in the furnace.

For illustrative purposes, the second temperature relationship will use the effluent temperature differences from the first temperature relationship based on the relative tube positions. For the second temperature relationship, the effluent from the non-imaged tube in the second tube row section 12b closest to the primary header 7 will be assigned a temperature difference value of +12, the effluent from the middle non-imaged tube a temperature difference value of 0, and the effluent from the non-imaged tube in the second tube row section 12b closest to the furnace wall a temperature difference value of −12. This is the same effluent temperature difference profile determined for the imaged tubes based on their position in the furnace (+12, 0, −12).

The step of processing to obtain temperature information for at least the subset 11a of the non-imaged tubes 11 of the plurality of tubes 4 may comprise calculating the representative effluent temperature for each non-imaged tube 11 in the second tube row section 12b from the representative temperature for the combined effluent from the non-imaged tubes 11 in the second tube row section 12b and the second temperature relationship.

Using the temperature difference profile determined for the non-imaged tubes (+12, 0, 12) and the representative temperature for the combined effluent from the non-imaged tubes 11 in the second tube row section 12b (i.e. 1496), the representative effluent temperature for the non-imaged tube closest to the primary header 7 is 1508 (i.e. 1496+12), the representative effluent temperature for the non-imaged tube in the middle is 1496 (i.e. 1496+0), and the representative effluent temperature for the non-imaged tube closest to the furnace wall is 1484 (i.e. 1496−12). These values for the representative effluent temperatures are shown in FIG. 4.

The step of processing to obtain temperature information for at least the subset 11a of the non-imaged tubes 11 of the plurality of tubes 4 may comprise calculating the temperature information for the non-imaged tubes 11 from the representative effluent temperature for each non-imaged tube 11 in the second tube row section 12b and a correlation that provides the temperature information for the non-imaged tubes 11 from the representative effluent temperatures.

The correlation that provides the temperature information for the non-imaged tubes 11 from the representative effluent temperatures can be derived from models and/or data from a furnace. These can be the same models and/or data used to develop the correlation that provide representative effluent temperatures from values representing the measure of central tendency.

For this illustrative calculation, a simple correlation between the tube temperature and the effluent temperature will be assumed where the tube temperature is 70 greater than the effluent temperature. Then the temperature information for the non-imaged tubes is found to be 1578 (i.e. 1508+70) for the tube closest to the primary header, 1566 (i.e. 1496+70) for the tube in the middle, and 1554 (i.e. 1484+70) for the tube closest to the furnace wall.

The second temperature relationship may be formulated using a third temperature relationship based on the temperatures and relative tube position of another adjacent row of tubes in the furnace in addition to the first temperature relationship. This extension of the illustrative calculation is described with reference to FIG. 5. The temperatures of the effluent from the adjacent tube row segment is 1600, 1500 and 1460. The mean temperature value for this tube row segment is 1520. The temperature difference profile relative to the mean temperature for this tube row segment is (+80, −20, −60).

The second temperature relationship can then be a weighted combination of the temperature difference profile for the first temperature relationship and the temperature difference profile for the third temperature relationship. For this illustrative calculation, we will assume an equal weighting.

Figure 5:
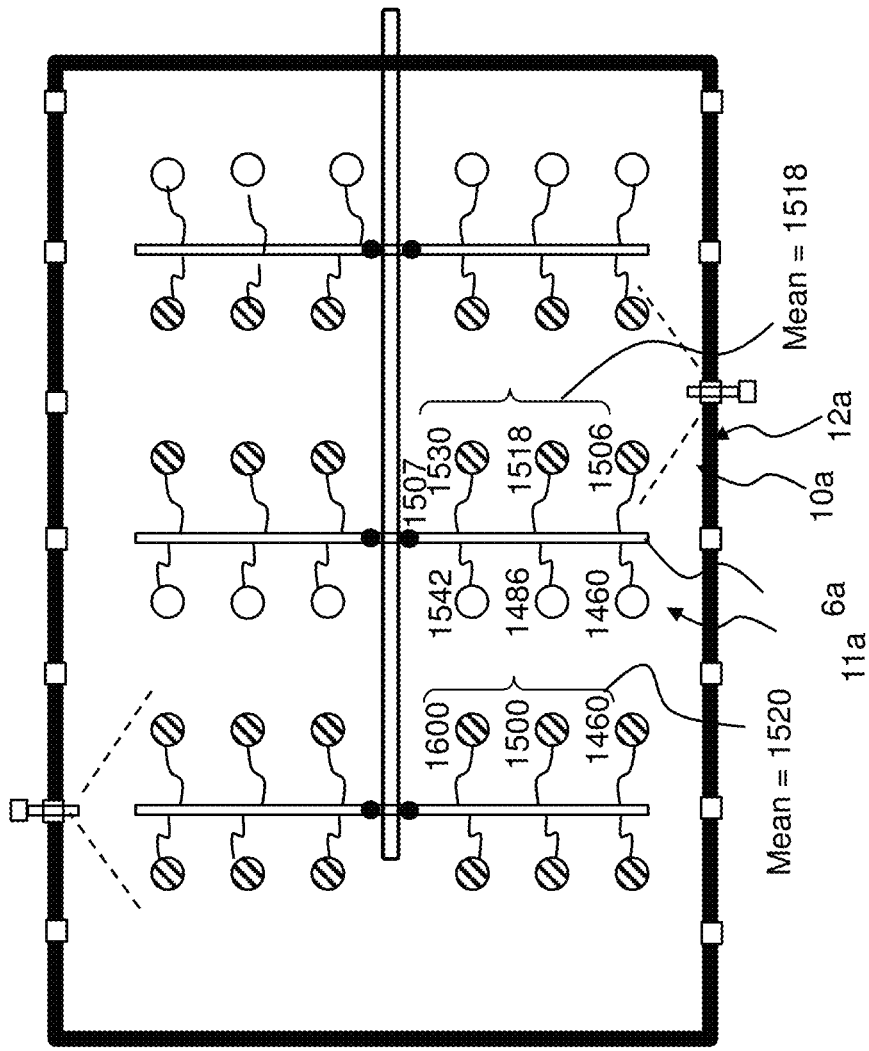
FIG. 5 shows a cross-section view of a furnace with hypothetical representative effluent temperatures used to describe the exemplary mathematical approach for the method.

The temperature difference profile determined for the imaged tubes based on their position in the furnace for the first temperature relationship was (+12, 0, −12). Then the temperature difference for the tube closest to the primary collection header 7 is (0.5)*80+(0.5)*12=+46. Likewise for the middle tube, the temperature difference is (0.5)*−20+(0.5)*0=−10 and for the tube closest to the furnace wall (0.5)*−60+(0.5)*−12=−36. The temperature difference profile determined for the non-imaged tubes is then (+46, −10, −36). The resulting representative effluent temperatures are calculated from the mean temperature of 1496 and are 1542, 1486, and 1460 and the values are shown in FIG. 5.

The calculation may be extended further to include weighted contributions from tubes further away from the non-imaged tubes, if desired. While in the illustrative calculation, temperature information for non-imaged tubes was determined using temperature information from adjacent imaged tubes, secondary effects using tube temperatures further away may be included if desired.

The temperature information for the non-imaged tubes 11 may be calculated as before from the representative effluent temperature for each non-imaged tube 11 and a correlation that provides the temperature information for the non-imaged tubes 11 from the representative effluent temperatures.

The illustrative calculations shown here are only examples of how the temperature information for the non-imaged tube temperatures can be calculated using the value relatable to the temperature of the combined effluent (i.e. a measured temperature in the secondary collection header) and the value representing the measure of central tendency for the imaged tubes.

Figure 6:
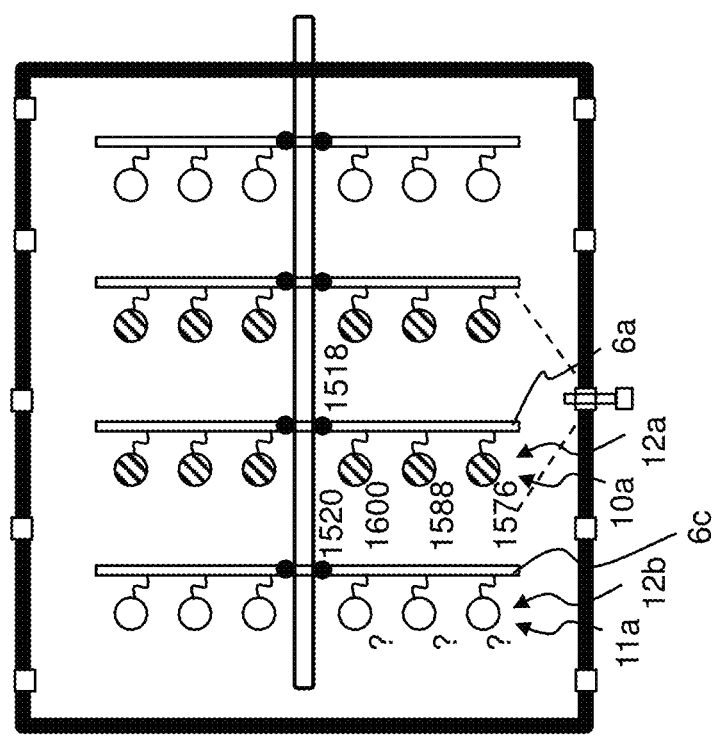
FIG. 6 shows a cross-section view of a furnace with hypothetical tube temperatures used to describe an exemplary mathematical approach for the method.
Figure 7:
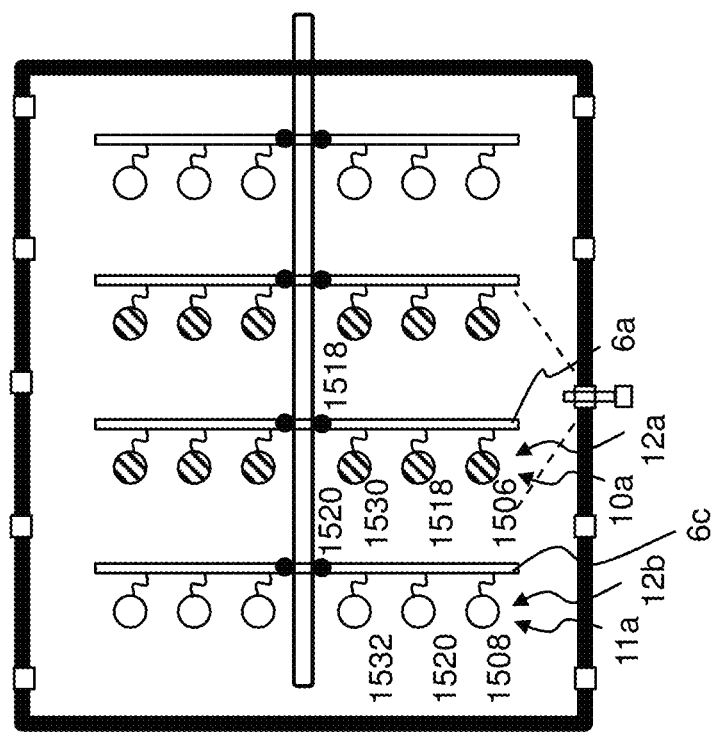
FIG. 7 shows a cross-section view of a furnace with hypothetical representative effluent temperatures used to describe the exemplary mathematical approach for the method.

The calculation can be somewhat simplified if different rows of tubes do not share a common secondary header, but the approach is similar. An illustrative calculation is shown with reference to FIG. 6 and FIG. 7. In FIG. 6 and FIG. 7, a first secondary collection header 6a is operatively connected to a first group of the plurality of tubes 4 consisting of a first tube row section 12a. A second secondary collection header 6c is operatively connected to a second group of the plurality of tubes 4 consisting of a second tube row section 12b.

The step of processing to obtain temperature information for at least the subset 11a of the non-imaged tubes 11 of the plurality of tubes 4 may comprise calculating a representative effluent temperature for each imaged tube 10 in a first tube row section 12a. Each imaged tube 10 in the first tube row section 12a is operatively connected to a first secondary collection header 6a and the effluent from each imaged tube 10 in the first tube row section 12a is combined in the first secondary collection header 6a before the combined effluent is passed to the primary collection header 7. The representative effluent temperature for each imaged tube 10 in the first tube row section 12a may be calculated from a correlation using the value representing the measure of central tendency for each imaged tube 10 in the first tube row section 12a. The correlation provides representative effluent temperatures from values representing the measure of central tendency.

This mathematical step is described with reference to FIG. 6 and FIG. 7. FIG. 6 illustrates a simplified furnace with hypothetical tube temperatures. A subset of imaged tubes 10a are assigned temperatures of 1600, 1588, and 1576. The temperatures of the non-imaged tubes 11a are the temperatures to be predicted from the temperatures of the imaged tubes 10a and the combined effluent temperature.

For this illustrative calculation, a simple correlation between the effluent temperature and the tube temperature will be assumed where the effluent temperature is 70 less than the tube temperature. Then the representative effluent temperature for each imaged tube in the tube row section is 1530, 1518, and 1506. These values for the effluent temperatures are shown in FIG. 7.

The step of measuring a value relatable to the temperature of the combined effluent in the one or more secondary collection headers 6 may include measuring a value relatable to a temperature of the combined effluent in the first secondary collection header 6a. The value relatable to the temperature of the combined effluent in the first secondary collection header 6a should be roughly equivalent to the combined value for the representative effluent temperatures for each imaged tube in the tube row section. The comparison may be used to provide an indication of correctness of the correlation used to determine the effluent temperature from the tube temperature. For this illustrative example, the mean value for the representative effluent temperatures and the measured value relatable to the temperature of the combined effluent in the first secondary collection header 6a are the same, 1518.

The step of measuring a value relatable to the temperature of the combined effluent in the one or more secondary collection headers 6 may include measuring a value relatable to a temperature of a combined effluent in a second secondary collection header 6c. As shown in FIG. 6 and FIG. 7, a second tube row section 12b of non-imaged tubes 11 is operatively connected to the second secondary collection header 6c. The effluent from each non-imaged tube 11 in the second tube row section 12b is combined in the second secondary collection header 6c before the combined effluent is passed to the primary collection header 7.

The step of processing to obtain temperature information for at least the subset 11a of the non-imaged tubes 11 of the plurality of tubes 4 may comprise determining a first temperature relationship, the first temperature relationship between the representative effluent temperature for each imaged tube 10 in the first tube row section 12a based on the tube position and the value relatable to the temperature of the combined effluent in the first secondary collection header 6a. For illustration purposes, the first temperature relationship will be the relative difference between representative effluent temperature for a tube and the value relatable to the temperature of the combined effluent in the first secondary collection header 6a. Then for example, the effluent temperature difference for the tube in the first tube row section 12a closest to the primary header 7 is +12 (i.e. 1530−1518). The effluent temperature difference for the tube in the middle is 0 (i.e. 1518−1518). The effluent temperature difference for the tube nearest the furnace wall is −12 (i.e. 1506−1518). The effluent temperature difference profile from the primary header 7 to the furnace wall is (+12, 0, −12).

The step of processing to obtain temperature information for at least the subset 11a of the non-imaged tubes 11 of the plurality of tubes 4 may comprise formulating a second temperature relationship, the second temperature relationship between a representative effluent temperature for each non-imaged tube 11 in the second tube row section 12b and the value relatable to the temperature of the combined effluent in the second secondary collection header 6c (i.e. 1520). The second temperature relationship is formulated using at least the first temperature relationship based on the relative tube position in the furnace.

For illustrative purposes, the second temperature relationship will use the effluent temperature differences from the first temperature relationship based on the relative tube positions. For the second temperature relationship, the effluent from the non-imaged tube in the second tube row section 12b closest to the primary header 7 will be assigned a temperature difference value of +12, the effluent from the middle non-imaged tube a temperature difference value of 0, and the effluent from the non-imaged tube in the second tube row section 12b closest to the furnace wall a temperature difference value of −12. This is the same effluent temperature difference profile determined for the imaged tubes based on their position in the furnace (+12, 0, −12).

The step of processing to obtain temperature information for at least the subset 11a of the non-imaged tubes 11 of the plurality of tubes 4 may comprise calculating the representative effluent temperature for each non-imaged tube 11 in the second tube row section 12b from the value relatable to the temperature of the combined effluent in the second secondary collection header 6c and the second temperature relationship.

Using the temperature difference profile determined for the non-imaged tubes (+12, 0, −12) and the value relatable to the temperature of the combined effluent in the second secondary collection header 6c (i.e. 1520), the representative effluent temperature for the non-imaged tube closest to the primary header 7 is 1520+12 (i.e. 1532), the representative effluent temperature for the non-imaged tube in the middle is 1520+0 (i.e. 1520), and the representative effluent temperature for the non-imaged tube closest to the furnace wall is 1520−12 (i.e. 1508). These values for the representative effluent temperatures are shown in FIG. 7.

The step of processing to obtain temperature information for at least the subset 11a of the non-imaged tubes 11 of the plurality of tubes 4 may comprise calculating the temperature information for the non-imaged tubes 11 from the representative effluent temperature for each non-imaged tube 11 in the second tube row section 12b and a correlation that provides the temperature information for the non-imaged tubes 11 from the representative effluent temperatures.

The correlation that provides the temperature information for the non-imaged tubes 11 from the representative effluent temperatures can be derived from models and/or data from a furnace. These can be the same models and/or data used to develop the correlation that provide representative effluent temperatures from values representing the measure of central tendency.

For this illustrative calculation, a simple correlation between the tube temperature and the effluent temperature will be assumed where the tube temperature is 70 greater than the effluent temperature. Then the temperature information for the non-imaged tubes is found to be 1602 (i.e. 1532+70) for the tube closest to the primary header, 1590 (i.e. 1520+70) for the tube in the middle, and 1578 (i.e. 1508+70) for the tube closest to the furnace wall.

The method may take advantage of supplemental temperature measurements, for example, from an optical pyrometer or similar device. FIG. 1 shows an optical pyrometer 15.

The method may further comprise measuring a value relatable to a temperature of a tube wall for one or more of the plurality of tubes 4 positioned within the furnace 1, for example with an optical pyrometer 15. The tube wall may be an imaged tube 10 or a non-imaged tube 11.

The value relatable to the temperature of the tube wall for the one or more of the plurality of tubes may also be processed to obtain the temperature information for at least the subset 11a of the non-imaged tubes 11 of the plurality of tubes 4 where at least the subset 11a of non-imaged tubes 11 comprises non-imaged tubes where the value relatable to the temperature of the tube wall was not measured (i.e. the optical pyrometer temperature information is used to obtain the temperature information for some non-imaged tubes that were not measured by the optical pyrometer).

The thermal imaging device can be moved to a different view port 2 to capture one or more digital images of the interior area of the furnace 1. The one or more digital images may comprise pixel data associated with a different subset of the plurality of tubes 4 positioned inside the furnace 1. A plurality of imaged tubes may be identified in the one or more digital images from the different view port. The remaining steps in the method may be applied mutatis mutandis. The historical data for imaged tubes and/or non-imaged tubes from the thermal imaging device captured from the earlier viewport may be used in the formulation of the first temperature relationship between the representative effluent temperature for each imaged tube and/or the second temperature relationship between the representative effluent temperature for each non-imaged tube.

Figure 9:
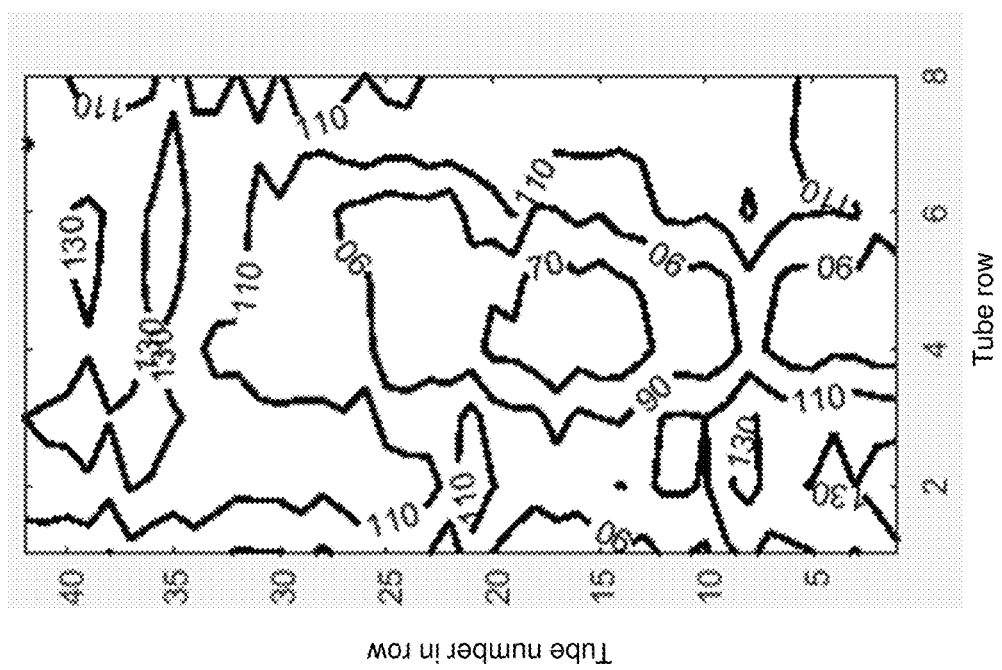
FIG. 9 shows an exemplary contour plot of the temperature difference for the tubes relative to the reference temperature at a selected elevation of a furnace according to the method.

Temperature information for imaged tubes and non-imaged tubes in the furnace 1 may be displayed as a contour plot or other suitable (color) graphic representation. FIG. 9 shows an exemplary contour plot of temperature difference information for the tubes 4 of a furnace 1 at a predetermined elevation. The plot can identify individual process tubes and rows.

The method disclosed herein may be applied to a plurality of elevations within furnace 1 and may be used to generate a three-dimensional view or representation of temperature data. View ports 2 can be located in upper and lower portions of furnace 1. Performing the method discussed above with both view ports in the upper and lower portions of furnace 1 permits the generation of a plot for the upper portion and the lower portion of furnace 1. Additional calculations incorporating anticipated differences in temperature at the various elevations using correlations and/or models may be incorporated to the three-dimensional plot. Incorporating the anticipated differences in temperatures permits the plot to account for anomalies with specific tubes 4. Multiple rows of segments at different elevations can be analyzed from images. The use of multiple segments at different elevations can also be used to generate a three-dimensional representation of temperature information.

Embodiments within the scope of the present method include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Having temperature information for the plurality of tubes in the furnace may be important for furnace control. The flow rates of oxidant (air) and/or fuel to the burners 3 may be adjusted responsive to determining the temperature information for the plurality of tubes.

Having temperature information for the plurality of tubes in the furnace may be important for improved furnace efficiency and reliability, avoiding premature tube failures and subsequent interruption to production. Furnace operation is generally limited by the highest tube temperature, while efficiency is related to the mean tube temperature. Uniform tube temperatures throughout the furnace is preferred, even during changes in operating conditions (production rates, feed property changes, and other controlling parameters). Semi-continuous temperature information throughout the furnace helps the operator maintain high mean tube temperatures without overheating, hence providing high operating efficiency. Tube life depends on the operating temperature of the tube metal. Having a record of the tube wall temperature over the furnace campaign would enable more accurate tube life estimation.

EXAMPLE

Thermal images were obtained for a reformer furnace having 8 tube rows with 46 tubes per row. Thermal imaging devices were installed so that all of the tubes in the furnace were imaged tubes.

Secondary collection headers collect effluent from respective pairs of half rows of tubes as depicted in FIGS. 1, 2, and 3. Temperatures for the combined effluent for each secondary collection header was measured using a thermocouple.

Figure 8:
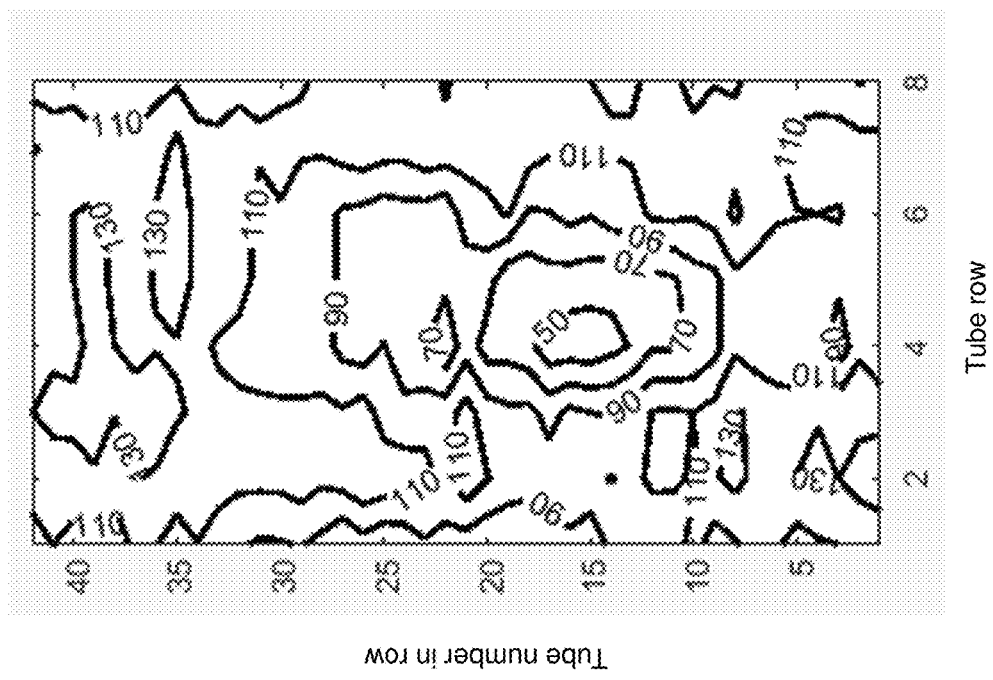
FIG. 8 shows an exemplary contour plot of the measured temperature difference for the tubes relative to a reference temperature at a selected elevation of a furnace.

FIG. 8 shows an exemplary contour plot of the measured temperature difference for the tubes relative to a reference temperature at a selected elevation of the furnace. A full complement of images were captured such that there were no non-imaged tubes for the contour plot in FIG. 8.

The present method is illustrated using information from only two thermal imaging devices installed at the view ports between row 2 and row 3 and between row 6 and row 7, and the temperatures measured in the secondary collection headers. Consequently, rows 2, 3, 6 and 7 are imaged tube rows and rows 1, 4, 5, and 8 are non-imaged tube rows.

The present method is used to determine the temperatures of the (hypothetical) non-imaged tubes. The results are plotted in FIG. 9, showing an exemplary contour plot of the temperature difference for the tubes relative to the same reference temperature used in FIG. 8 at the same selected elevation of the furnace. In FIG. 9, the temperature contours were obtained using the present method.

It is evident from FIG. 8 and FIG. 9 that the temperature contours closely resemble each other, and the hot and cold zones are very well captured using the present method. Temperature maps obtained using the present method are satisfactory for guiding furnace operation and evaluating tube life.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method for determining temperature information on a plurality of tubes in a furnace, the method comprising:
capturing one or more digital images of an interior area of the furnace wherein the one or more digital images comprises pixel data associated with a subset of the plurality of tubes positioned inside the furnace;
identifying a plurality of imaged tubes in the subset of the plurality of tubes in the one or more digital images, the plurality of tubes comprising the imaged tubes and non-imaged tubes, the imaged tubes detected in the one or more digital images, the non-imaged tubes not detected in any of the one or more digital images;
processing a portion of the pixel data associated with the plurality of imaged tubes to obtain a value representing a measure of central tendency for at least a subset of the plurality of imaged tubes in the one or more digital images;
processing the value representing the measure of central tendency for at least the subset of the plurality of imaged tubes to obtain temperature information for at least the subset of the plurality of imaged tubes;
withdrawing an effluent from each of the plurality of tubes;
collecting the effluent withdrawn from each of the plurality of tubes in a plurality of secondary collection headers, each of the plurality of secondary collection headers operatively connected to a respective group of multiple groups of the plurality of tubes, the effluent collected in each secondary collection header forming a respective combined effluent in each secondary collection header;
passing the effluent collected in each respective secondary collection header to a primary collection header;
measuring a value relatable to a temperature of the combined effluent in one or more secondary collection headers of the plurality of secondary collection headers; and
processing the value representing the measure of central tendency for at least the subset of the plurality of imaged tubes and the value relatable to the temperature of the combined effluent in the one or more secondary collection headers to obtain temperature information for at least a subset of the non-imaged tubes of the plurality of tubes.

2. The method of claim 1 further comprising measuring a value relatable to a temperature of the combined effluent for each of one or more additional secondary collection headers of the plurality of secondary collection headers;
wherein the value relatable to the temperature of the combined effluent for each of the one or more additional secondary collection headers is processed in the step of processing to obtain temperature information for at least the subset of the non-imaged tubes.

3. The method of claim 1
wherein the step of processing to obtain temperature information for at least the subset of the non-imaged tubes of the plurality of tubes comprises:
calculating a representative effluent temperature for each imaged tube in a first tube row section, each imaged tube in the first tube row section operatively connected to a first secondary collection header wherein the effluent from each imaged tube in the first tube row section is combined in the first secondary collection header before the combined effluent is passed to the primary collection header, wherein the representative effluent temperature for each imaged tube in the first tube row section is calculated from a correlation using the value representing the measure of central tendency for each imaged tube in the first tube row section, wherein the correlation provides representative effluent temperatures from values representing the measure of central tendency; and processing the representative effluent temperature for each imaged tube in the first tube row section and the value relatable to the temperature of the combined effluent in the one or more secondary collection headers;

wherein the step of measuring a value relatable to the temperature of the combined effluent in the one or more secondary collection headers comprises measuring a value relatable to a temperature of the combined effluent in the first secondary collection header.

4. The method of claim 3 wherein the step of processing to obtain temperature information for at least the subset of the non-imaged tubes of the plurality of tubes comprises:

calculating a representative effluent temperature for each non-imaged tube in a second tube row section operatively connected to the first secondary collection header, the representative effluent temperature for each non-imaged tube in the second tube row section calculated from the representative effluent temperature for each imaged tube in the first tube row section.

5. The method of claim 3 wherein the step of processing to obtain temperature information for at least the subset of the non-imaged tubes of the plurality of tubes comprises:

calculating a representative effluent temperature for each non-imaged tube in a second tube row section operatively connected to a second secondary collection header, the representative effluent temperature for each non-imaged tube in the second tube row section calculated from the representative effluent temperature for each imaged tube in the first tube row section;

wherein the step of measuring a value relatable to the temperature of the combined effluent in the one or more secondary collection headers further comprises measuring a value relatable to a temperature of the combined effluent in the second secondary collection header, wherein the effluent from each non-imaged tube in the second tube row section is combined in the second secondary collection header before the combined effluent is passed to the primary collection header.

6. The method of claim 1 wherein the step of processing to obtain temperature information for at least the subset of the non-imaged tubes of the plurality of tubes comprises:

calculating a representative effluent temperature for each imaged tube in a first tube row section, each imaged tube in the first tube row section operatively connected to a first secondary collection header wherein the effluent from each imaged tube in the first tube row section is combined in the first secondary collection header before the combined effluent is passed to the primary collection header, wherein the representative effluent temperature for each imaged tube in the first tube row section is calculated from a correlation using the value representing the measure of central tendency for each imaged tube in the first tube row section, wherein the correlation provides representative effluent temperatures from values representing the measure of central tendency; and calculating a representative temperature for a combined effluent from the imaged tubes in the first tube row section using the representative effluent temperature for each imaged tube in the first tube row section;

wherein the step of measuring a value relatable to the temperature of the combined effluent in the one or more secondary collection headers comprises measuring a value relatable to a temperature of the combined effluent in the first secondary collection header; and wherein the step of processing to obtain temperature information for at least the subset of the non-imaged tubes of the plurality of tubes further comprises:

calculating a representative temperature for a combined effluent from the non-imaged tubes in a second tube row section operatively connected to the first secondary collection header wherein the effluent from each non-imaged tube in the second tube row section is combined in the first secondary collection header before the combined effluent is passed to the primary collection header, wherein the representative temperature for the combined effluent from the non-imaged tubes in the second tube row section is calculated from the value relatable to the temperature of the combined effluent in the first secondary collection header and the representative temperature for the combined effluent from the imaged tubes in the first tube row section;

determining a first temperature relationship, the first temperature relationship between the representative effluent temperature for each imaged tube in the first tube row section and the representative temperature for the combined effluent from the imaged tubes in the first tube row section;

formulating a second temperature relationship, the second temperature relationship between a representative effluent temperature for each non-imaged tube in the second tube row section and the representative temperature for the combined effluent from the non-imaged tubes in the second tube row section, where the second temperature relationship is formulated using at least the first temperature relationship;

calculating the representative effluent temperature for each non-imaged tube in the second tube row section from the representative temperature for the combined effluent from the non-imaged tubes in the second tube row section and the second temperature relationship; and calculating the temperature information for the non-imaged tubes from the representative effluent temperature for each non-imaged tube in the second tube row section and a correlation that provides the temperature information for the non-imaged tubes from the representative effluent temperature for each non-imaged tube in the second tube row section.

7. The method of claim 1
wherein the step of processing to obtain temperature information for at least the subset of the non-imaged tubes of the plurality of tubes comprises:
  calculating a representative effluent temperature for each imaged tube in a first tube row section, each imaged tube in the first tube row section operatively connected to a first secondary collection header wherein the effluent from each imaged tube in the first tube row section is combined in the first secondary collection header before the combined effluent is passed to the primary collection header, wherein the representative effluent temperature for each imaged tube in the first tube row section is calculated from a correlation using the value representing the measure of central tendency for each imaged tube in the first tube row section, wherein the correlation provides representative effluent temperatures from values representing the measure of central tendency;
wherein the step of measuring a value relatable to the temperature of the combined effluent in the one or more secondary collection headers comprises
  measuring a value relatable to a temperature of the combined effluent in the first secondary collection header; and
  measuring a value relatable to a temperature of a combined effluent in a second secondary collection header, wherein a second tube row section of non-imaged tubes is operatively connected to the second secondary collection header, wherein the effluent from each non-imaged tube in the second tube row section is combined in the second secondary collection header before the combined effluent is passed to the primary collection header; and
wherein the step of processing to obtain temperature information for at least the subset of the non-imaged tubes of the plurality of tubes further comprises:
  determining a first temperature relationship, the first temperature relationship between the representative effluent temperature for each imaged tube in the first tube row section and the value relatable to the temperature of the combined effluent in the first secondary collection header;
  formulating a second temperature relationship, the second temperature relationship between a representative effluent temperature for each non-imaged tube in the second tube row section and the value relatable to the temperature of the combined effluent in the second secondary collection header, where the second temperature relationship is formulated using at least the first temperature relationship;
  calculating the representative effluent temperature for each non-imaged tube in the second tube row section from the value relatable to the temperature of the combined effluent in the second secondary collection header and the second temperature relationship; and
  calculating the temperature information for the non-imaged tubes from the representative effluent temperature for each non-imaged tube in the second tube row section and a correlation that provides the temperature information for the non-imaged tubes from the representative effluent temperature for each non-imaged tube in the second tube row section.

8. The method of claim 1 wherein the step of processing the value representing the measure of central tendency for at least the subset of the plurality of imaged tubes comprises determining temperature values for at least the subset of the plurality of imaged tubes from the corresponding value representing the measure of central tendency for at least the subset of the plurality of imaged tubes.

9. The method of claim 1 wherein the step of processing the value representing the measure of central tendency for at least the subset of the plurality of imaged tubes and the value relatable to the temperature of the combined effluent in the one or more secondary collection headers to obtain temperature information for at least the subset of the non-imaged tubes of the plurality of tubes comprises determining a temperature value for at least the subset of the non-imaged tubes from the value representing the measure of central tendency for at least the subset of the plurality of imaged tubes and the value relatable to the temperature of the combined effluent in the one or more secondary collection headers.

10. The method of claim 1 further comprising:
  measuring a value relatable to a temperature of a tube wall for one or more of the plurality of tubes positioned within the furnace;
  wherein the value relatable to the temperature of the tube wall for the one or more of the plurality of tubes is also processed to obtain the temperature information for at least the subset of the non-imaged tubes of the plurality of tubes; and
  wherein at least the subset of non-imaged tubes comprises non-imaged tubes where the value relatable to the temperature of the tube wall was not measured.

* * * * *